(12) United States Patent
Kato

(10) Patent No.: US 6,771,386 B1
(45) Date of Patent: Aug. 3, 2004

(54) IMAGE FORMING SYSTEM

(75) Inventor: Hiroyuki Kato, Ichikawa (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 869 days.

(21) Appl. No.: 09/661,789

(22) Filed: Sep. 14, 2000

(51) Int. Cl.⁷ .............................................. G06F 15/00
(52) U.S. Cl. ................................. 358/1.15; 358/1.13
(58) Field of Search ........................ 358/1.1, 1.7, 1.8, 358/1.9, 1.13, 1.14, 1.15, 1.17, 400, 538; 718/100, 102; 399/8, 80

(56) References Cited

U.S. PATENT DOCUMENTS

| | | | |
|---|---|---|---|
| 5,287,204 A | | 2/1994 | Koizumi et al. ............ 358/538 |
| 5,689,755 A | * | 11/1997 | Ataka ............................ 399/8 |
| 5,781,711 A | * | 7/1998 | Austin et al. ............... 358/1.15 |
| 5,970,218 A | | 10/1999 | Mullin et al. ................ 395/114 |
| 6,065,036 A | * | 5/2000 | Hisatake ...................... 718/100 |
| 6,487,611 B1 | * | 11/2002 | Brusky et al. ................. 710/10 |
| 6,507,716 B2 | * | 1/2003 | Nomura et al. ............... 399/80 |
| 6,621,590 B1 | * | 9/2003 | Livingston ................. 358/1.15 |
| 6,659,662 B2 | * | 12/2003 | Grohs .......................... 400/76 |
| 6,687,018 B1 | * | 2/2004 | Leong et al. .............. 358/1.15 |
| 6,687,905 B1 | * | 2/2004 | Day et al. .................... 718/102 |
| 6,694,345 B1 | * | 2/2004 | Brelsford et al. ........... 718/100 |

FOREIGN PATENT DOCUMENTS

| | | |
|---|---|---|
| JP | 4-336876 | 11/1992 |
| JP | 6-22072 | 1/1994 |
| JP | 6-225167 | 8/1994 |
| JP | 7-123282 | 5/1995 |
| JP | 7-222012 | 8/1995 |
| JP | 8-251319 | 9/1996 |
| JP | 11-27542 | 1/1999 |
| JP | 11-31061 | 2/1999 |
| JP | 11-282645 | 10/1999 |

* cited by examiner

*Primary Examiner*—Gabriel Garcia
(74) *Attorney, Agent, or Firm*—Foley & Lardner LLP

(57) ABSTRACT

When private printing is performed by confirmation of a password on the color digital copying machine side in something in which a large amount of private printing is printed according to an instruction from a client PC by a color digital copying machine connected via a network, this invention makes it possible to switch single printing in one color digital copying machine previously set by an instruction of the client PC or tandem printing in two color digital copying machines when the private printing is performed by confirmation of a password on the color digital copying machine side. As a result, switching to the single printing or tandem printing can be freely made on the color digital copying machine side. Further, the number of copies in the tandem printing can be freely set on the color digital copying machine side. In addition, the numbers of copies in the tandem printing can be decided based on the processing abilities by the two color digital copying machines.

12 Claims, 13 Drawing Sheets

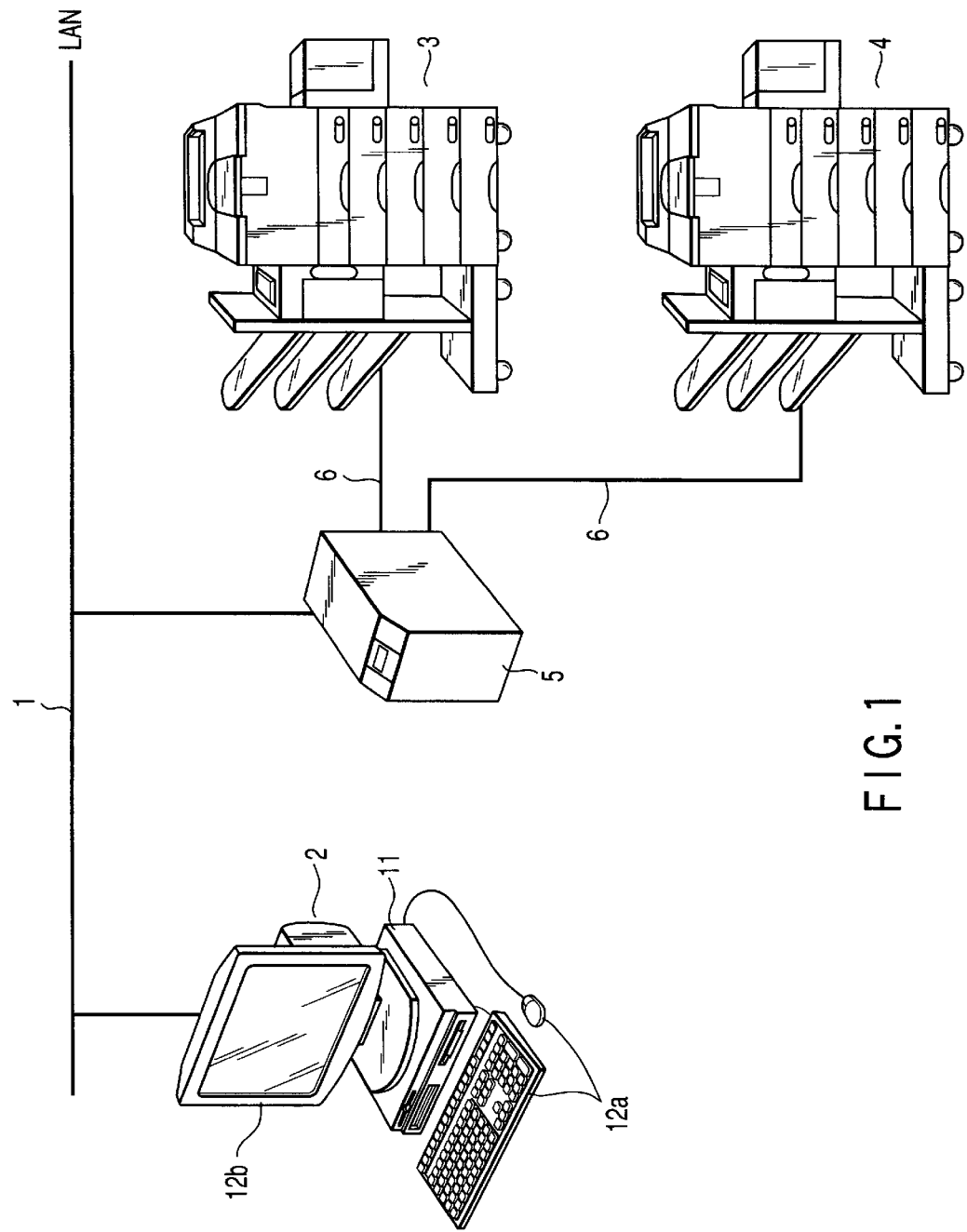
F I G. 1

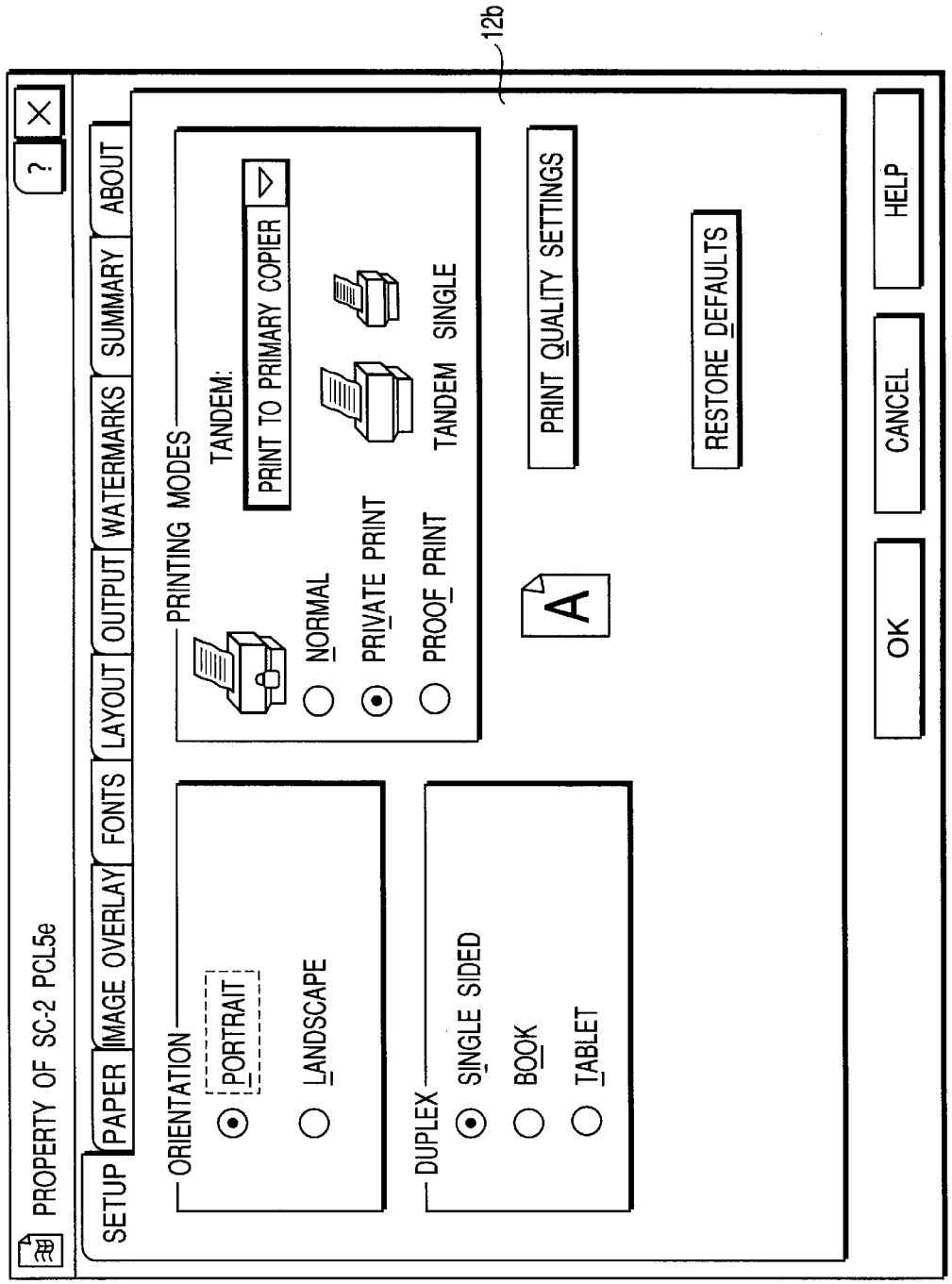
F I G. 7

IMAGE FORMING SYSTEM

BACKGROUND OF THE INVENTION

This invention relates to an image forming system having a personal computer for a client connected on a local network and a plurality of color digital copying machines having a printing function connected via a controller, for example.

In recent years, an image forming system having a personal computer (client PC, terminal) for a client connected on a local network (LAN, communication line) and a plurality of color digital copying machines (printing devices) having a printing function connected via a controller is proposed.

In the image forming system, a printing process is effected by the digital copying machine based on a printing job from the client PC.

In the above image forming system, private printing can be effected in order to protect the security of the printing job.

The private printing is effected as follows.

First, private printing is instructed and a password is input when printing is instructed by the client PC.

Further, printing jobs for the private printing are previously stored in the printing device and a list of printing jobs for the private printing stored is displayed based on the instruction of the private printing from a control panel. According to this display, a printing job which is desired to be printed is selected and the same password as the password input by the client PC is input. If the passwords coincide, the digital copying machine performs the printing of the printing job.

By using the above method, the security when. printing of high security level such as a confidential document, for example, is performed is attained (refer to Pat. Appln. KOKAI Publication Heisei No. 11-31061).

Further, in the above image forming system, when a large number of copies are printed, a system in which loads of the printing job are distributed (tandem printed) to two or more printing devices to enhance the processing speed is proposed (refer to Pat. Appln. KOKAI Publication Heisei No. 11-282645).

If the client PC specifies the distributed printing process (tandem printing) in the two or more printing devices for such a large number of copies, the instruction specified by the client PC cannot be changed on the printing device side.

That is, the tandem printing is to distribute a large amount of printings to a plurality of printing devices and process the same and time can be reduced by instantly starting when printing data is supplied to each printing device.

Therefore, a concept of switching to single printing for collectively printing them by one printing device after the client PC specifies the tandem printing is not present.

Further, if an attempt is made to effect the tandem printing when the private printing is effected, printing is effected by different printing devices installed in different places and the inherent security of the private printing does not function, and therefore, the tandem printing is set so as not to be effected when the private printing is effected.

However, in a state wherein a plurality of printing devices which effect the tandem printing are set close to each other and the printing operations thereof can be simultaneously monitored, the tandem printing can be effected at the time of private printing without losing the security function.

Since it is required to effect a subject identifying process on the printing device side when the tandem printing is effected at the time of private printing, it is desired to develop a system in which the tandem printing and single printing can be switched at the above processing time.

BRIEF OF THE INVENTION

In an image forming system which comprises at least one terminal and first, second image forming apparatuses connected to the terminal via a communication line, for respectively effecting image formation on image forming media based on an image forming job from the terminal and in which the first, second image forming apparatuses are set close to each other, an object of this invention can provide the image forming system in which a change to distributed image formation by the first, second image forming apparatuses can be made on the first image forming apparatus side when image formation only by the first image forming apparatus or second image forming apparatus for private image formation is instructed from the terminal.

Further, the numbers of copies in the distributed image formation by the first, second image forming apparatuses can be freely set.

Further, the number of copies in the distributed image formation by the first, second image forming apparatuses can be set based on the processing abilities of the first, second image forming apparatuses.

Further, in an image forming system which comprises at least one terminal and first, second image forming apparatuses connected to the terminal via a communication line, for respectively effecting image formation on image forming media based on an image forming job from the terminal and in which the first, second image forming apparatuses are set close to each other, an object of this invention can provide the image forming system in which a change to image formation only by the first image forming apparatus or second image forming apparatus can be made on the first image forming apparatus side when distributed image formation by the first, second image forming apparatuses for private image formation is instructed from the terminal.

In an image forming system which comprises at least one terminal and first, second image forming apparatuses connected to the terminal via a communication line, for respectively effecting image formation on image forming media based on an image forming job from the terminal and in which the first, second image forming apparatuses are set close to each other, this invention is the image forming system characterized in that the terminal includes transmission means for transmitting an image forming job having a password, for causing the first image forming apparatus or second image forming apparatus to independently effect image formation to the first image forming apparatus and the first image forming apparatus includes receiving means for receiving the image forming job having the password and transmitted from the terminal, storage means for sequentially storing the image forming job having the password and received by the receiving means, first display means for displaying image forming jobs stored in the storage means, selecting means for selecting one of the image forming jobs displayed on the first display means, input means for inputting the password of the image forming job, determining means for determining whether the image forming job is permitted or not according to whether or not the password input by the input means and the password of the image forming job selected by the selecting means coincide, second display means for displaying a selection screen which indicates whether or not the independent image formation by the first image forming apparatus or second image forming apparatus is switched to distributed image formation in the first, second image forming apparatuses when it is determined by the determining means that the image forming job is permitted, first execution means for executing distributed image formation on image forming media by the first, second image forming apparatuses with respect to the image forming job which is determined to be permissible by the determining means when switching to the distributed image formation in the first, second image forming apparatuses is selected according to the display of the second display means, and second execution means for executing image formation on an image forming medium in the first image forming apparatus or second image forming apparatus with respect to the image forming job which is determined to be permissible by the determining means when switching to the distributed image formation in the first, second image forming apparatuses is not selected according to the display of the second display means.

In an image forming system which comprises at least one terminal and first, second image forming apparatuses connected to the terminal via a communication line, for respectively effecting image formation on image forming media based on an image forming job from the terminal and in which the first, second image forming apparatuses are set close to each other, this invention is the image forming system characterized in that the terminal includes transmission means for transmitting an image forming job having a password, for causing the first, second image forming apparatuses to distributedly effect image formation to the first image forming apparatus and the first image forming apparatus includes receiving means for receiving the image forming job having the password and transmitted from the terminal, storage means for sequentially storing the image forming job having the password and received by the receiving means, first display means for displaying image forming jobs stored in the storage means, selecting means for selecting one of the image forming jobs displayed on the first display means, input means for inputting the password of the image forming job, determining means for determining whether the image forming job is permitted or not according to whether or not the password input by the input means and the password of the image forming job selected by the selecting means coincide, second display means for displaying a selection screen which indicates whether or not the distributed image formation by the first, second image forming apparatuses is switched to independent image formation in the first image forming apparatus or second image forming apparatus when it is determined by the determining means that the image forming job is permitted, first execution means for executing image formation on an image forming medium by the first image forming apparatus or second image forming apparatus with respect to the image forming job which is determined to be permissible by the determining means when switching to the independent image formation in the first image forming apparatus or second image forming apparatus is selected according to the display of the second display means, and second execution means for executing distributed image formation on image forming media in the first, second image forming apparatuses with respect to the image forming job which is determined to be permissible by the determining means when switching to the independent image formation in the first image forming apparatus or second image forming apparatus is not selected according to the display of the second display means.

In an image forming system which comprises at least one terminal and first, second image forming apparatuses connected to the terminal via a communication line, for respectively effecting image formation of a plurality of copies on image forming media based on an image forming job from the terminal and in which the first, second image forming apparatuses are set close to each other, this invention is the image forming system characterized in that the terminal includes transmission means for transmitting an image forming job having a password, for causing the first image forming apparatus or second image forming apparatus to independently effect image formation of a plurality of copies to the first image forming apparatus and the first image forming apparatus includes receiving means for receiving the image forming job having the password and transmitted from the terminal, storage means for sequentially storing the image forming job having the password and received by the receiving means, first display means for displaying image forming jobs stored in the storage means, first selecting means for selecting one of the image forming jobs displayed on the first display means, input means for inputting the password of the image forming job, determining means for determining whether the image forming job is permitted or not according to whether or not the password input by the input means and the password of the image forming job selected by the first selecting means coincide, second display means for displaying a selection screen which indicates whether or not the independent image formation by the first image forming apparatus or second image forming apparatus is switched to distributed image formation in the first, second image forming apparatuses when it is determined by the determining means that the image forming job is permitted, second selecting means for selecting switching to the distributed image formation in the first, second image forming apparatuses according to the display on the second display means, third display means for displaying a setting screen of the respective numbers of copies which are subjected to the distributed image formation in the first, second image forming apparatuses when the distributed image formation in the first, second image forming apparatuses is selected by the second selecting means, setting means for setting the number of image formation copies in the first image forming apparatus and the number of image formation copies in the second image forming apparatus according to the display of the third display means, first execution means for executing distributed image formation on image forming media by the first, second image forming apparatuses with respect to the image forming job which is determined to be permissible by the determining means based on the numbers of image formation copies set by the setting means, and second execution means for executing image formation of a plurality of copies on image forming media in the first image forming apparatus or second image forming apparatus with respect to the image forming job which is determined to be permissible by the determining means when switching to the distributed image formation in the first, second image forming apparatuses is not selected by the second selecting means.

In an image forming system which comprises at least one terminal and first, second image forming apparatuses connected to the terminal via a communication line, for respectively effecting image formation of a plurality of copies on image forming media based on an image forming job from the terminal and in which the first, second image forming apparatuses are set close to each other, this invention is the image forming system characterized in that the terminal includes transmission means for transmitting an image forming job having a password, for causing the first image forming apparatus to independently effect image formation of a plurality of copies to the first image forming apparatus and the first image forming apparatus includes receiving means for receiving the image forming job having the password and transmitted from the terminal, storage means for sequentially storing the image forming job having the password and received by the receiving means, first display means for displaying image forming jobs stored in the storage means, first selecting means for selecting one of the image forming jobs displayed on the first display means, input means for inputting the password of the image forming job, determining means for determining whether the image forming job is permitted or not according to whether or not the password input by the input means and the password of the image forming job selected by the first selecting means coincide, second display means for displaying a selection screen which indicates whether or not the independent image formation by the first image forming apparatus or second image forming apparatus is switched to distributed image formation in the first, second image forming apparatuses when it is determined by the determining means that the image forming job is permitted, second selecting means for selecting switching to the distributed image formation in the first, second image forming apparatuses according to the display on the second display means, deciding means for deciding the numbers of image formation copies in the first, second image forming apparatuses based on the respective processing abilities of image formation in the first, second image forming apparatuses when the distributed image formation in the first, second image forming apparatuses is selected by the second selecting means, first execution means for executing distributed image formation on image forming media in the first, second image forming apparatuses with respect to the image forming job which is determined to be permissible by the determining means based on the numbers of image formation copies decided by the deciding means, and second execution means for executing image formation of a plurality of copies on image forming media in the first image forming apparatus or second image forming apparatus with respect to the image forming job which is determined to be permissible by the determining means when switching to the distributed image formation in the first, second image forming apparatuses is not selected by the second selecting means.

BRIEF DESCRIPTION OF THE SEVERAL VIEWS OF THE DRAWING

FIG. 1 is a view showing the schematic construction of an image processing system;

FIG. 7 is a view showing a setting screen of printing condition in a client PC;

DETAILED DESCRIPTION OF THE INVENTION

There will now be described an embodiment of this invention with reference to the accompanying drawings.

FIG. 1 shows the schematic construction of an image processing system of this invention.

That is, as shown in FIG. 1, the image processing system has a construction in which a plurality of personal computers (PC, client PC) 2 which respective users can individually utilize and two color digital copying machines 3, 4 having a high-speed image printing function (printer function, image output device) and commonly used by a plurality of users are connected on a local network (LAN) 1. The two color digital copying machines 3, 4 are connected to the LAN 1 via a printer controller 5. The color digital copying machines 3, 4 and the printer controller 5 are connected to each other via interfaces (SCSI) 6.

For example, the color digital copying machine 3 is set as a master printer and the color digital copying machine 4 is set as a slave printer. As a result, the color digital copying machine 3 is a parent machine for controlling the color digital copying machine 4. The color digital copying machine 4 is a slave device put under the control of the color digital copying machine 3.

As a result, printing information from the client PC 2, . . . is transmitted to the color digital copying machines 3, 4 via the LAN 1 and the printing information is printed by the color digital copying machines 3, 4.

Figure 2:
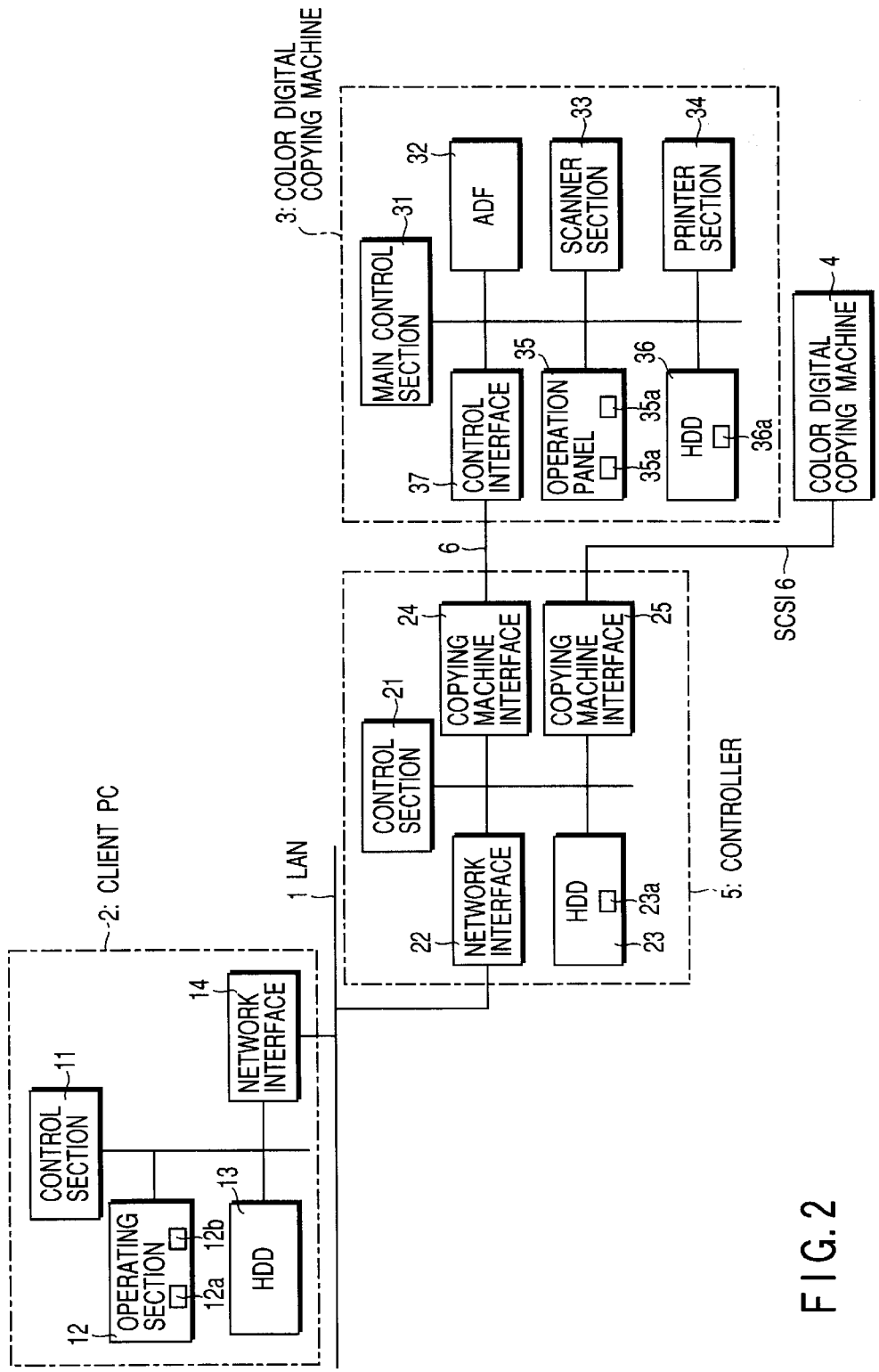
FIG. 2 is a block diagram showing the schematic construction of the image processing system.

The client PC 2, . . . are constructed by personal computers, and as shown in FIG. 2, a control section 11 for controlling the whole portion is provided. To the control section 11, an operating section 12 formed of a keyboard and mouse as an input section 12a and a display section 12b, an image data registration HDD 13 and a network interface 14 connected to the LAN 1 are connected.

The printer controller 5 is used as a distributed processing server, and as shown in FIG. 2, a control section 21 for controlling the whole portion is provided. To the control section 21, a network interface 22 connected to the LAN 1, an image data registration HDD 23, a copying machine interface 24 connected to the color digital copying machine 3 via the SCSI 6, and a copying machine interface 25 connected to the color digital copying machine 4 via the SCSI 6 are connected.

In the HDD 23, a job management table 23a for storing printing jobs supplied from the client PC is provided.

The internal construction of the control circuit of the color digital copying machine 3 is explained by use of FIG. 2.

In the color digital copying machine 3, a main control section 31 for controlling the whole portion is provided. Although not shown in the drawing, the main control section 31 is constructed by a CPU (central processing unit) for controlling the operation thereof, a ROM (Read only memory) in which a software for the operation of the digital copying machine is stored, and a RAM (random access memory) (S-RAM) for temporarily storing image data and other data on the operation.

The main control section 31 is connected to an automatic original feeding device (ADF) 32, scanner section 33, printer section 34, operation panel 35, HDD 36, controller interface 37.

The ADF 32 is an automatic original feeding device as feeding means provided on the upper surface of the apparatus main body and used for automatically feeding an original set on an original tray (not shown) onto an original placing table (not shown).

The scanner section 33 acquires original reading image data by scanning and reading an original placed on the original placing table.

The printer section 34 prints the original reading image data or prints image data from the exterior.

Figure 3:
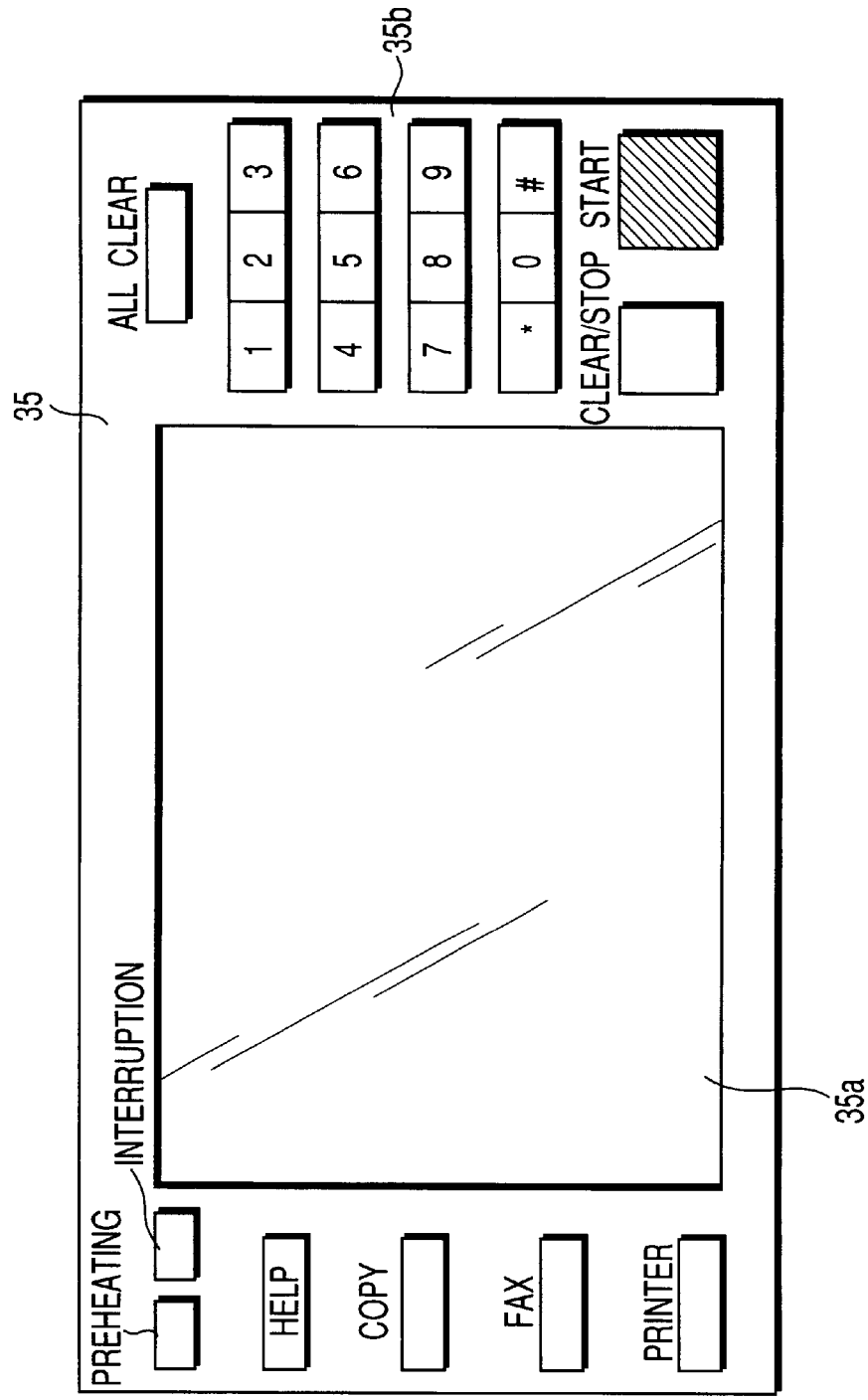
FIG. 3 is a view showing an operation panel of a color digital copying machine.
Figure 4A:
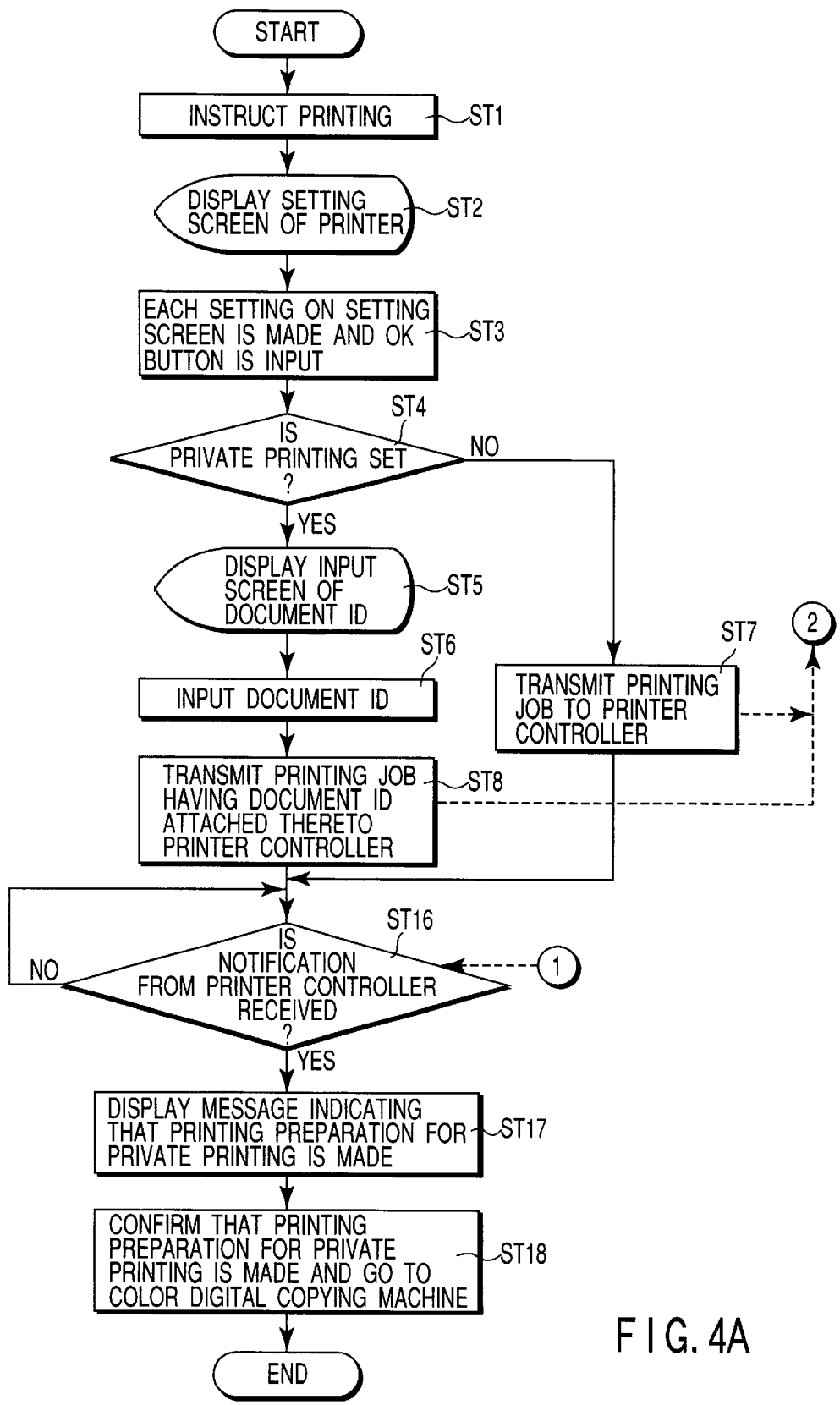
FIGS. 4A and 4B are flowcharts for illustrating the printing process in the image forming system.
Figure 4B:
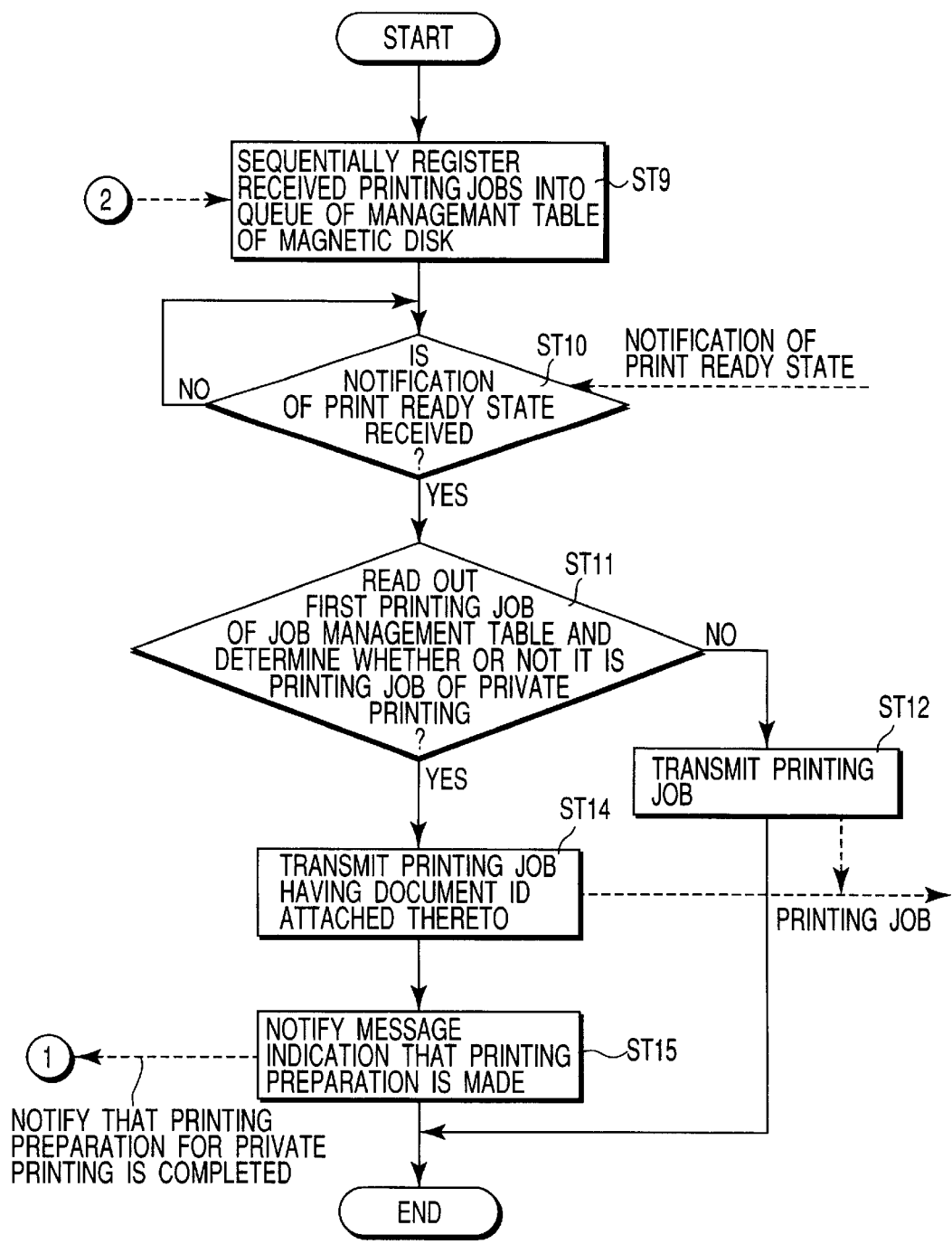
Figure 5A:
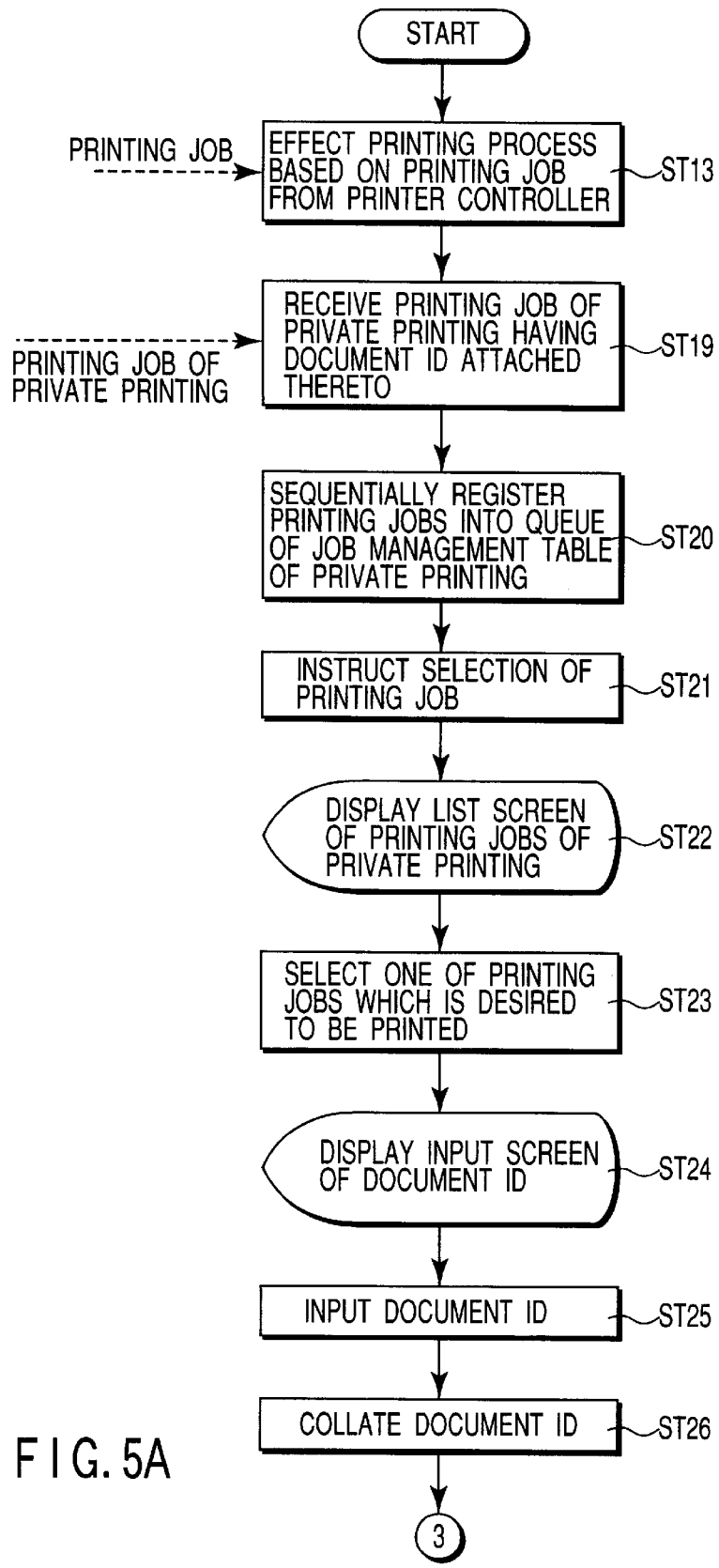
FIGS. 5A and 5B are flowcharts for illustrating the printing process in the image forming system.
Figure 5B:
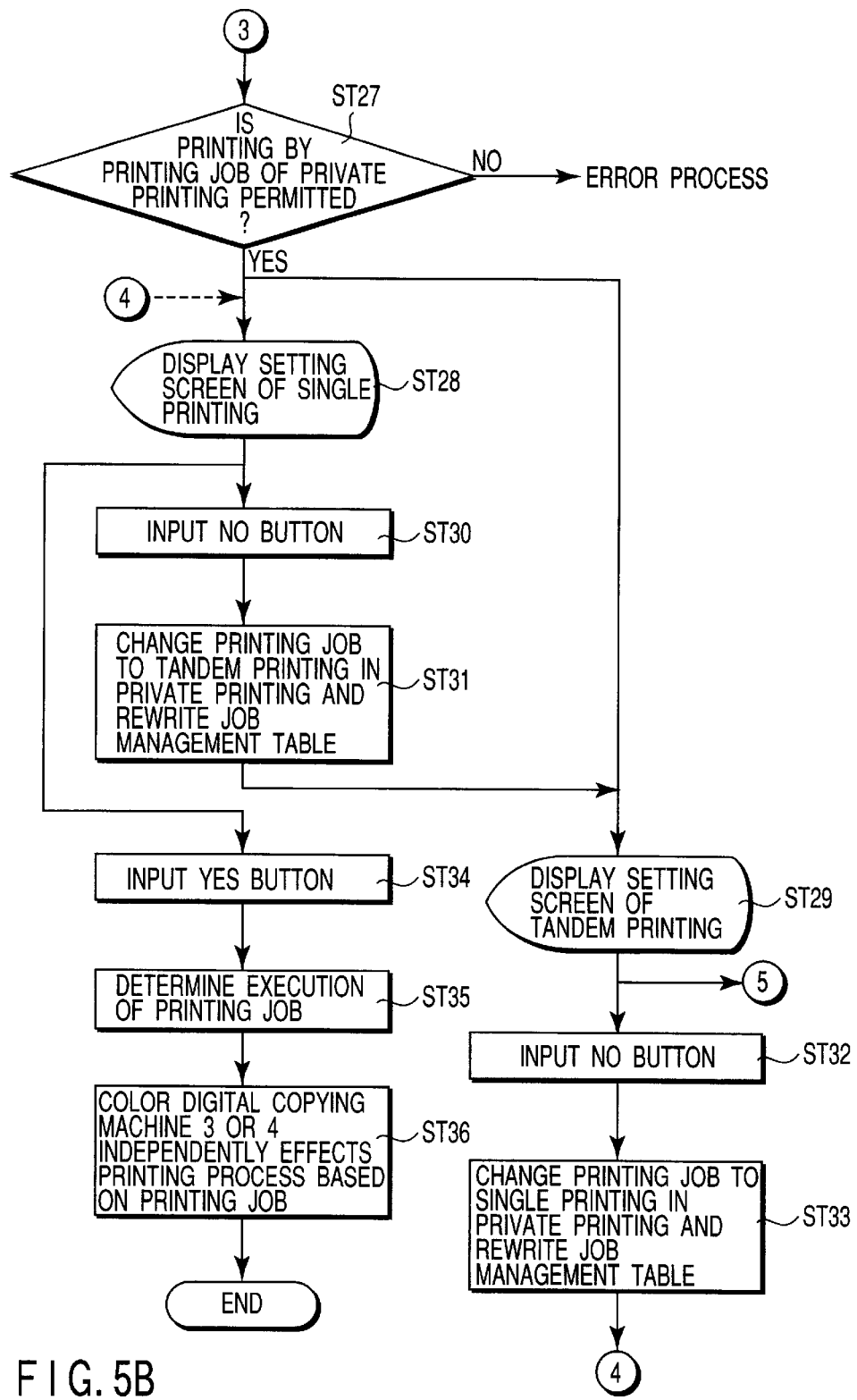
Figure 6:
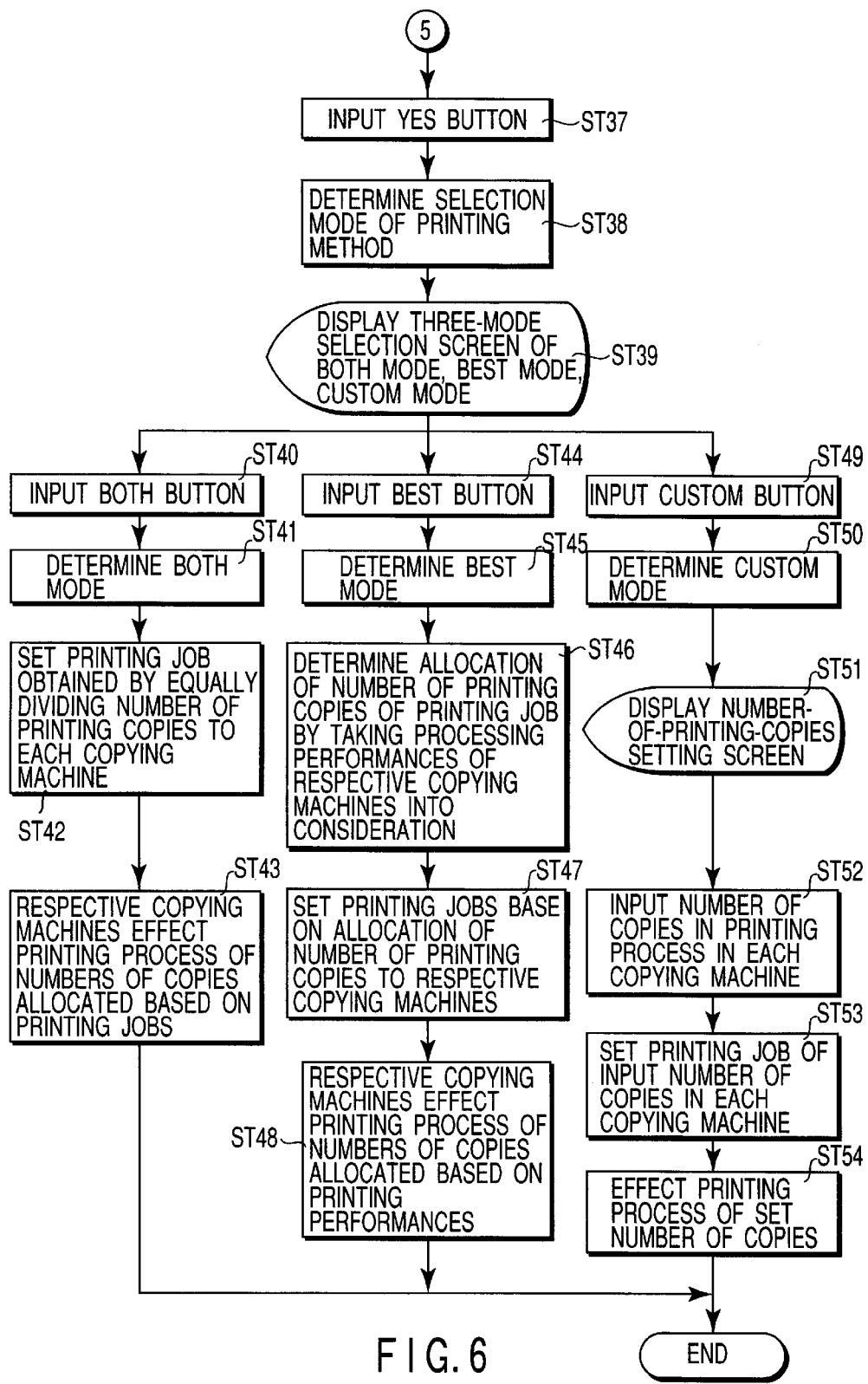
FIG. 6 is a flowchart for illustrating the printing process in the image forming system.

As shown in FIG. 3, the operation panel 35 is used as a display input section constructed by a liquid crystal display section 35a containing a touch panel and hard keys such as a ten-key pad 35b, and instructions of various operations, settings and the like are input via the touch panel and hard keys and an operation guidance and a guidance of error contents at the time of error are displayed on the liquid crystal display section 35a.

The HDD 36 is an external storage device represented by a hard disk in which various data is stored. For example, when a plurality of copies are copied or printed, an image obtained by compressing a plurality of sheets of images is registered and the compressed image is read out and printed at the time of printing.

The controller interface 37 is connected to the printer controller 12 via the SCSI 6 to transmit or receive a job and image data.

In the HDD 36, a job management table 36a for storing printing jobs for private printing supplied from the printer controller 12 is provided.

The internal construction of the control circuit of the color digital copying machine 4 is also substantially the same as the internal construction of the control circuit of the color digital copying machine 3, but a job management table 36a is not contained in the HDD 36.

Next, the printing process is explained with reference to the flowcharts shown in FIGS. 4A, 4B, 5A, 5B and 6.

First, the user gives a printing instruction on the operating section 13 of the client PC 2 (ST1). Then, the control section 11 causes the display section 14 to display a printer setting screen, that is, a property dialog of the printer driver as shown in FIG. 7 (ST2).

As the setting screen, as shown in FIG. 7, setting of the orientation of the printing image which is a portrait or landscape, setting of the type of the original which is a single side, book or tablet, and setting of the printing mode which is normal, private printing or proof printing are made and tandem printing or single printing can be set. Further, an OK button, cancel button and help button are also displayed.

The tandem printing indicates a distributed printing process in the color digital copying machines 3, 4 and the single printing indicates a printing process in one of the color digital copying machines 3, 4.

The normal printing is a mode in which print is made as it is based on the printing job, the private printing is a mode in which print is made when the private ID is coincident, and the proof printing is a mode in which trial print is made.

The setting is made by writing checks in a check box of each of the settings. However, one of the tandem printing and single printing which has a larger display icon of the printer is selected.

Figure 8:
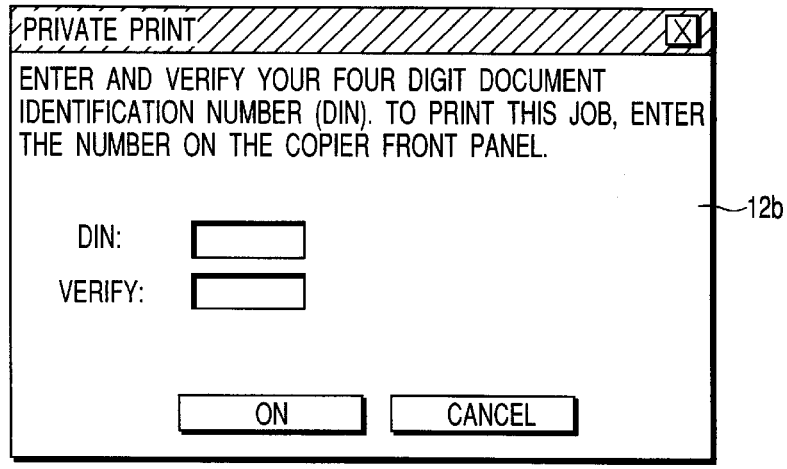
FIG. 8 is a view showing an input screen of password in a client PC.

Each setting of the setting screen is made and the OK button is input (ST3). Then, the control section 11 causes the display section 14 to display an input screen of a document ID (password for the document) as shown in FIG. 8 (ST5) when the private printing is set (ST4). Based on the display, the user inputs a document ID via the operating section 13 (ST6).

Since the ten-key pad is mounted on the control panel 37 of the color digital copying machines 3, 4, a password of a four-digit numeral is used as the document ID, for example.

As a result, the control section 11 transmits the printing job to the printer controller 5 (ST7) when the OK button is indicated in a state in which the printing mode is set in the normal or proof printing.

Further, when the printing mode is set in the private printing and the document ID is input, the control section 11 transmits the printing job having the document ID attached thereto to the printer controller 5 (ST8).

The control section 21 of the printer controller 5 sequentially registers the received printing jobs in the queue of the job management table 23a of the magnetic disk (HDD) 23 (ST9).

The control section 21 of the printer controller 5 reads out a first printing job of the job management table 23a to determine whether or not it is a printing job of the private printing (ST11) when notification of the print-ready state is received from the color digital copying machines 3, 4 (ST10).

If the result of the determination is not the printing job of the private printing, the control section 21 of the printer controller 5 transmits the printing job to the color digital copying machines 3, 4 (ST12).

As a result, the color digital copying machines 3, 4 perform the printing process based on the printing job from the printer controller 5 (ST13).

When the result of the determination in the step 11 is the printing job of the private printing, the control section 21 of the printer controller 5 transmits the printing job having the document ID attached thereto to the control section 31 of the color digital copying machine 3 (ST14). Further, the control section 21 notifies the client PC 2 of a message indicating that the printing preparation is made (ST15).

As a result, the control section 11 of the client PC 2 receives notification from the printer controller 5 (ST16) and causes the display section 11 to display a message indicating that the printing preparation for the private printing is made (ST17). According to the display, the user confirms that the printing preparation for the private printing is made and goes to the color digital copying machine 3 (ST18).

Further, the main control section 31 of the color digital copying machine 3 receives the printing job of the private printing having the document ID attached thereto from the printer controller 5 (ST19) and sequentially registers the printing job into the queue of the job management table 36a of the private printing of the magnetic disk (HDD) 36 (ST20).

Figure 9:
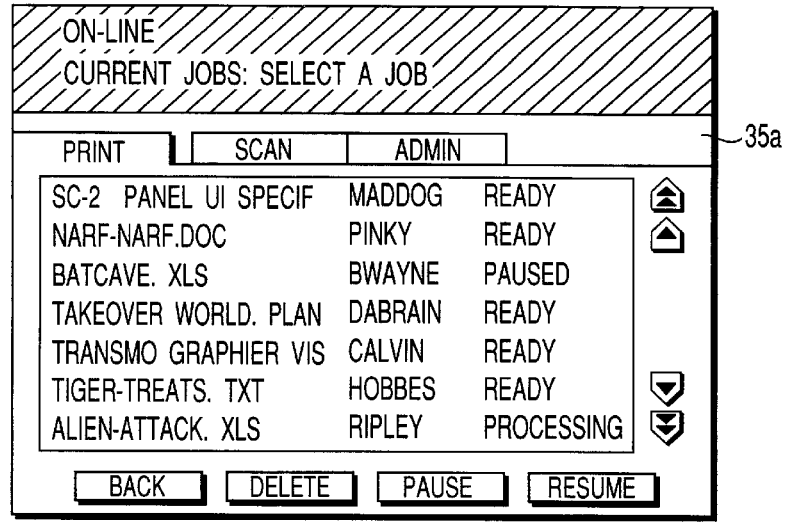
FIG. 9 is a view showing a job selecting screen of private printing on the operation panel of the color digital copying machine.

Further, the user who goes to the color digital copying machine 3 operates the liquid crystal display section 35a of the operation panel 35 to instruct selection of the printing job (ST21). As a result, the main control section 31 reads out all of the printing jobs of the private printing from the job management table 36a and causes the liquid crystal display section 35a to display a list screen of the printing jobs of the private printing as shown in FIG. 9 (ST22). That is, a list of the selectable printing jobs of the private printing stored in the color digital copying machine 3 is displayed on the liquid crystal display section 35a.

Figure 10:
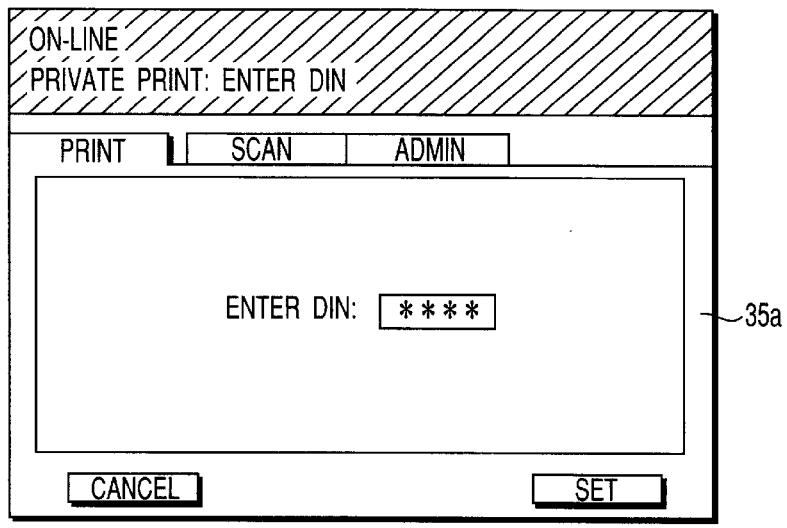
FIG. 10 is a view showing an input screen of password for private printing on the operation panel of the color digital copying machine.

On the list screen display, the user operates the liquid crystal display section 35a of the operation panel 35 to select one of the printing jobs which is desired to be printed (ST23). Then, the main control section 31 causes the liquid crystal display section 35a of the operation panel 35 to display the input screen of the document ID (password for the document) as shown in FIG. 10 (ST24).

Based on the display, the user inputs a document ID by use of the ten-key pad 35b of the operating section 35 (ST25). In this case, the document ID of a four-digit numeral which is the same as that input in the client PC 2 is input.

By the input, the main control section 31 collates the document ID (ST26) and determines whether or not the printing by the printing job of the private printing is permitted according to whether coincidence occurs or not (ST27).

By the above determination, if the printing by the printing job of the private printing is not permitted, the main control section 31 performs an error process.

By the above determination, if the printing by the printing job of the private printing is permitted, the main control section 31 causes the liquid crystal display section 35a of the operation panel 35 to display the setting screen of the signal printing or tandem printing which is now set (ST28, 29).

Figure 11:
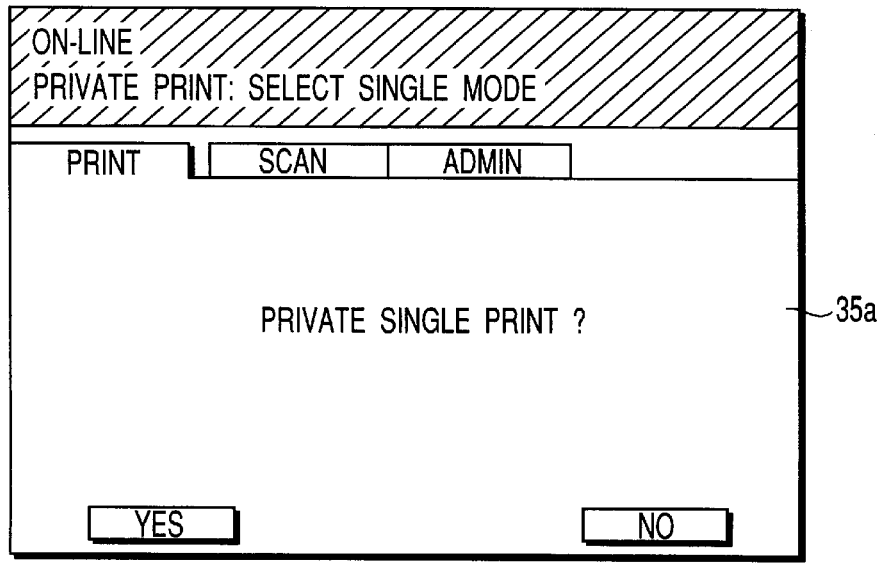
FIG. 11 is a view showing a setting screen of single printing for private printing on the operation panel of the color digital copying machine.

That is, when the printing job is the private printing and the single printing is indicated, the main control section 31 causes the liquid crystal display section 35a of the operation panel 35 to display the setting screen of the signal printing as shown in FIG. 11 (ST28). On the display, the user inputs a NO button of the liquid crystal display section 35a when a setting change to the tandem printing is made (ST30). The printing job is the private printing and a change is made to the tandem printing by the input of the NO button, and the main control section 31 rewrites the job management table 36a (ST31) and causes the liquid crystal display section 35a of the operation panel 35 to display the setting screen of the tandem printing as shown in FIG. 12 (ST29).

As a result, even if the single printing is indicated on the client PC 2 side, the user can make a change to the tandem printing on the color digital copying machine 3 side.

Figure 12:
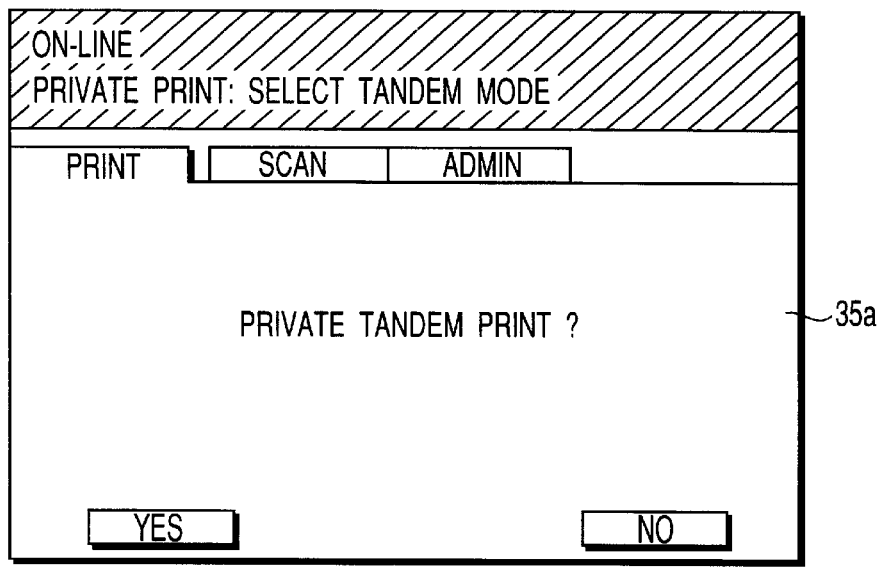
FIG. 12 is a view showing a setting screen of tandem printing for private printing on the operation panel of the color digital copying machine.

Further, when the printing job is the private printing and the tandem printing is indicated, the main control section 31 causes the liquid crystal display section 35a of the operation panel 35 to display the setting screen of the tandem printing as shown in FIG. 12 (ST29). On the display, the user inputs the NO button of the liquid crystal display section 35a when a setting change to the single printing is made (ST32). By the input of the NO button, the printing job is the private printing and a change is made to the single printing and the main control section 31 rewrites the job management table 36a (ST33) and causes the liquid crystal display section 35a of the operation panel 35 to display the setting screen of the single printing as shown in FIG. 11 (ST28).

As a result, even if the tandem printing is indicated on the client PC 2 side, the user can make a change to the single printing on the color digital copying machine 3 side.

Therefore, selection of the tandem printing or selection of the single printing in the private printing is dependent on the user.

As a result, even if the single printing (tandem printing) is indicated on the client PC 2 side, the user can make a change to the tandem printing (single printing) on the color digital copying machine 3 side.

Further, when the user inputs a YES button on the setting screen of the single printing as shown in FIG. 11 (ST34), the main control section 31 determines execution of the printing job (ST35).

As a result, the color digital copying machine 3 or 4 independently performs the printing process based on the printing job (ST36).

Figure 13:
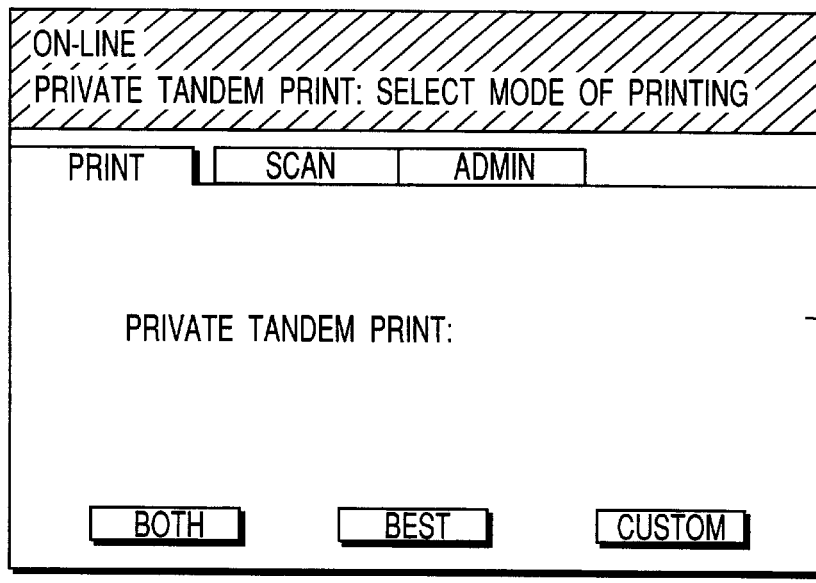
FIG. 13 is a view showing a selecting screen of a printing method in the tandem printing shown in FIG. 12.

Further, when the user inputs the YES button on the setting screen of the tandem printing as shown in FIG. 12 (ST37), the main control section 31 determines a selection mode of the printing method (ST38) and causes the liquid crystal display section 35a of the operation panel 35 to display a selection screen of three modes of a both mode, best mode, custom mode as shown in FIG. 13 (ST39).

The both mode is a mode in which halves are distributed to the two color digital copying machines 3, 4 and copies are equally allocated to the two copying machines 3, 4. For example, if the private printing of ten copies is made, five copies/five copies obtained by dividing the same by 2 are distributed to the two copying machines 3, 4.

The best mode is to allocate printing copies by taking the processing performances (engine speeds) of the two color digital copying machines 3, 4 into consideration. For example, if the copying machine 3 is a 40 sheets/minute device (a device capable of effecting the process for printing 40 sheets of A4 size for one minute, for example) and the copying machine 4 is a 60 sheets/minute device (a device capable of effecting the process for printing 60 sheets of A4 size for one minute, for example), allocation of four copies to the copying machine 3 and six copies to the copying machine 4 is performed.

Figure 14:
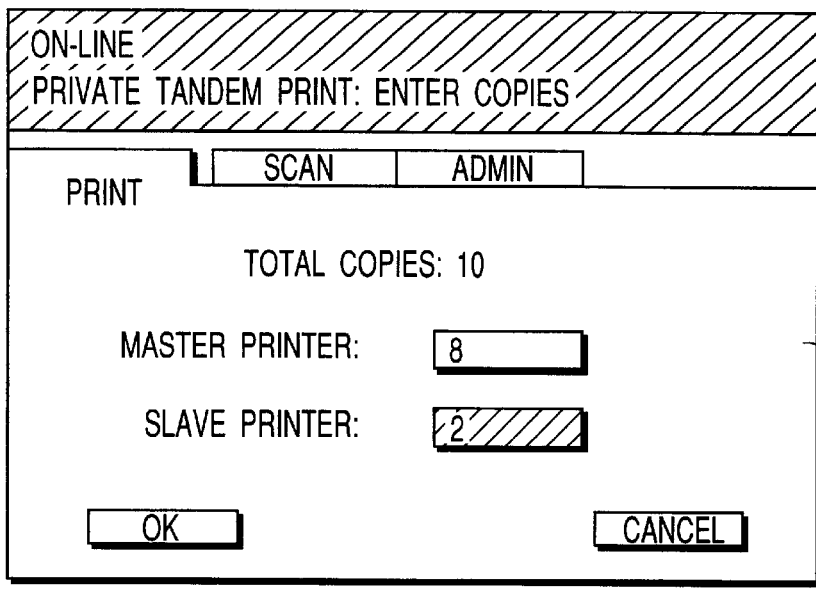
FIG. 14 is a view showing a number-of-copies input screen when a custom button (icon) shown in FIG. 13 is selected.

The custom mode is a mode in which the printing numbers to be processed by the two color digital copying machines 3, 4 are freely set. At the time of selection of the mode, the main control section 31 causes the liquid crystal display section 35a of the operation panel 35 to display a printing number setting screen as shown in FIG. 14. In this mode, the numbers of copies which the user wants to print in the copying machine 3 and copying machine 4 can be input.

That is, when a both button is input (ST40) in a state in which the selection screen of the three modes of the both mode, best mode, custom mode in the step 39 is displayed, the main control section 31 of the copying machine 3 determines the both mode (ST41), sets one of printing jobs obtained by equally dividing the printing copies of the printing job in the main control section 31 of the copying machine 3 and sets the other printing job in the main control section 31 of the copying machine 4 (ST42).

As a result, the color digital copying machines 3, 4 perform the printing processes for the numbers of copies equally allocated based on the printing job (ST43). For example, for the printing job of the private printing of ten copies, the printing processes for five copies are respectively effected in the color digital copying machines 3, 4.

Further, when a best button is input (ST44) in a state in which the selection screen of the three modes of the both mode, best mode, custom mode in the step 39 is displayed, the main control section 31 of the copying machine 3 determines the best mode (ST45), determines allocation of the numbers of printing copies of the printing job by taking the processing performances (engine speeds) of the color digital copying machines 3, 4 into consideration (ST46), sets one of the printing jobs based on the allocation in the main control section 31 of the copying machine 3 and sets the other printing job based on the allocation in the main control section 31 of the copying machine 4 (ST47).

As a result, the color digital copying machines 3, 4 perform the printing processes for the numbers of copies allocated based on the respective printing performances (ST48). For example, for the printing job of the private printing of ten copies, the printing process for four copies is effected by the color digital copying machine 3 and the printing process for six copies is effected by the color digital copying machine 4 in a case where the printing performance of the copying machine 3 is a 40 sheets/minute device and the printing performance of the copying machine 4 is a 60 sheets/minute device.

That is, loads of printing jobs are distributed by taking the engine speeds of the respective printing devices (color digital copying machines) into consideration.

Further, when a custom button is input (ST49) in a state in which the selection screen of the three modes of the both mode, best mode, custom mode in the step 39 is displayed, the main control section 31 of the copying machine 3 determines the custom mode (ST50) and causes the liquid crystal display section 35a of the operation panel 35 to display the setting screen of the number of printing copies as shown in FIG. 14 (ST51). According to the display, the user inputs the numbers of copies in the respective printing processes in the color digital copying machines 3, 4 by use of the ten-key pad 35b of the operating section 35 and inputs the OK button (ST52)

As a result, the main control section 31 sets the printing job of the number of copies input to the master printer in the main control section 31 of the copying machine 3 and sets the printing job of the number of copies input to the slave printer in the main control section 31 of the copying machine 4 (ST53).

As a result, the color digital copying machines 3, 4 perform the printing processes for the numbers of copies respectively set therein (ST54). For example, for the printing job of the private printing of ten copies, eight copies are set in the color digital copying machine 3 and two copies are set in the color digital copying machine 4, and the printing process for eight copies is effected by the color digital copying machine 3 and the printing process for two copies is effected by the color digital copying machine 4.

Figure 15:
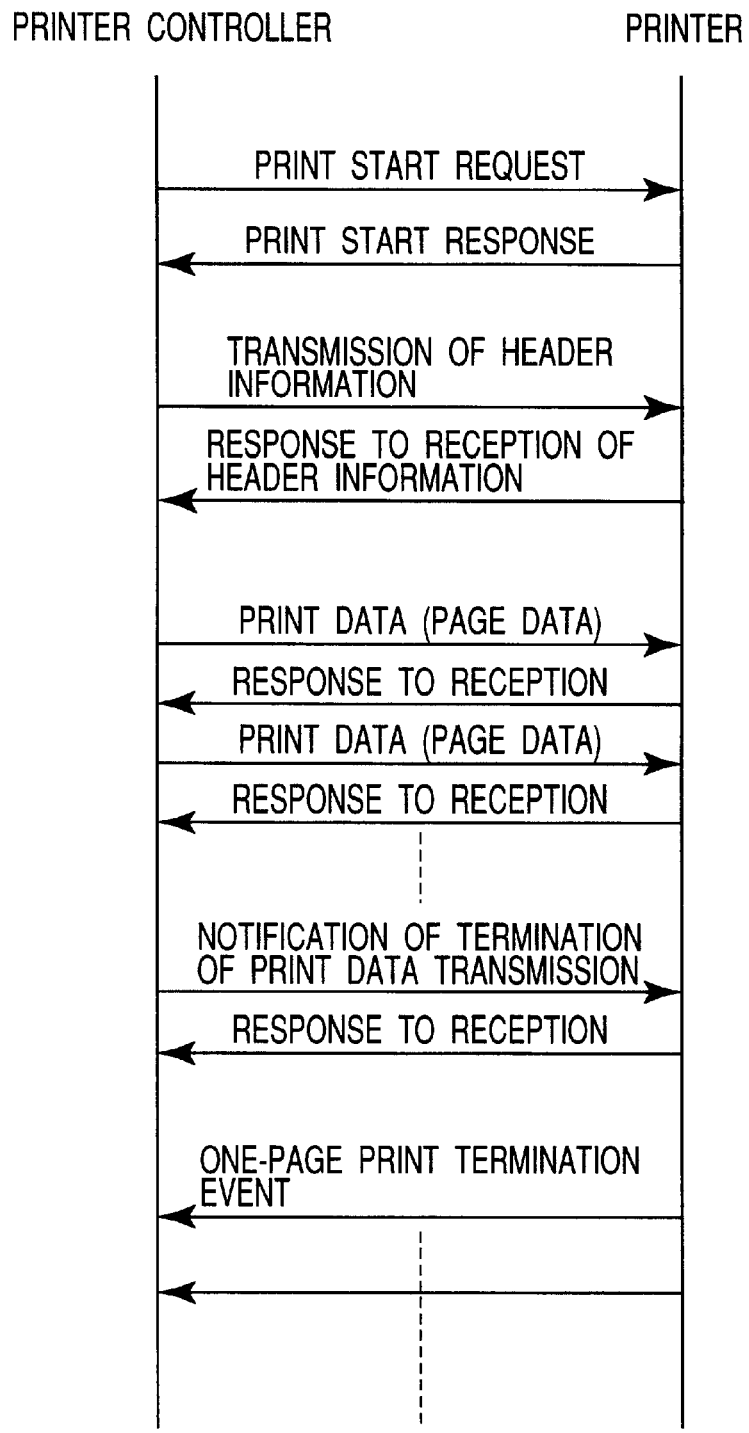
FIG. 15 is a diagram for illustrating transfer of data between a printer controller and the color digital copying machine.

Next, transfer of data between the printer controller 5 and the color digital copying machines 3, 4 is explained by use of FIG. 15.

That is, if the printer controller 5 receives print data from the client PC 2, it first effects the RIP process to perform raster conversion and then respectively transmits data after conversion to the color digital copying machine 3 as a mastering printer and the color digital copying machine 4 as a slave printer.

At this time, print data to be transmitted is one copy.

The color digital copying machines 3, 4 each have an internal print data storing HDD and store (hold) the print data received from the printer controller 5 in the HDD.

Further, the printer controller 5 transmits header information indicating the numbers of to-be-printed copies specified by the client PC to the respective color digital copying machines 3, 4.

As a result, the color digital copying machines 3, 4 respectively make prints of the specified numbers of copies when receiving the print data and reduced information.

That is, the printer controller 5 transmits a print start request to the color digital copying machine 3 (4). The color digital copying machine 3 (4) returns a print start response to the printer controller 5 based on the request.

The printer controller 5 transmits header information to the color digital copying machine 3 (4) in response to the print start response. The color digital copying machine 3, 4 returns a header information response to the printer controller 5 based on the transmission.

The printer controller 5 sequentially transmits print data for each page data to the color digital copying machine 3 (4) in response to the header information response. The color digital copying machine 3 (4) returns a reception response to the printer controller 5 based on the transmission of print data for each page data.

Then, when transmission of one copy of print data is terminated, the printer controller 5 transmits notification of termination of print data transmission to the color digital copying machine 3 (4). Based on the transmission, the color digital copying machine 3 (4) returns a reception response to the printer controller 5.

After this, the color digital copying machine 3 (4) returns a one-page print termination event to the printer controller 5 each time one-page printing is terminated.

Then, when print termination events for a specified number of copies are returned, the printer controller 5 determines termination of the printing by the color digital copying machine 3 (4).

As described above, when the private printing is effected by confirmation of the password on the color digital copying machine side in something in which a large amount of private printing is printed by the color digital copying machine connected via the network according to an instruction from the client PC, the single printing in one color digital copying machine which is previously set by the instruction of the client PC or the tandem printing by the two color digital copying machines can be changed when the private printing is effected by confirmation of the password on the color digital copying machine side.

As a result, the single printing or tandem printing can be freely switched on the color digital copying machine side.

Further, the number of copies of the tandem printing can be freely set on the color digital copying machine side.

Further, the numbers of copies of the tandem printing can be decided based on the process abilities of the two color digital copying machines.

Particularly, when the color printing is performed, the printing time can be shortened by distributing the load of the printing job.

That is, one action for inputting a password always occurs at the private printing time, but by using this as an advantage and by providing means which can specify the tandem printing at the timing at which the private printing is instructed for printing on the control panel of the copying machine, it becomes possible for the user to select the tandem printing not only on the client but also in a place in which the printer is installed and the range of the selection timing of the tandem printing can be widened for the user.

In the former embodiment, a case wherein the two color digital copying machines as the printing devices are connected is explained, but a case wherein three or more devices are connected can also be realized in the same manner as described above.

Further, a case wherein the four-digit numeral is used as the password when confirmation of the document ID is made is explained, but confirmation of the document ID may be made by a radio medium provided with a blue tooth, IC card, radio card, finger (fingerprint) confirmation.

What is claimed is:

1. In an image forming system which comprises at least one terminal and first, second image forming apparatuses connected to said terminal via a communication line, for respectively effecting image formation on image forming media based on an image forming job from said terminal and in which said first, second image forming apparatuses are set close to each other, the image forming system characterized in that
said terminal includes:
  transmission means for transmitting an image forming job having a password, for causing said first image forming apparatus or second image forming apparatus to independently effect image formation to said first image forming apparatus, and
  said first image forming apparatus includes:
    receiving means for receiving the image forming job having the password and transmitted from said terminal,
    storage means for sequentially storing the image forming job having the password and received by said receiving means,
    first display means for displaying image forming jobs stored in said storage means,
    selecting means for selecting one of the image forming jobs displayed on said first display means,
    input means for inputting the password of the image forming job,
    determining means for determining whether the image forming job is permitted or not according to whether or not the password input by said input means and the password of the image forming job selected by said selecting means coincide,
    second display means for displaying a selection screen which indicates whether or not independent image formation by said first image forming apparatus or second image forming apparatus is switched to distributed image formation in said first, second image forming apparatuses when it is determined by said determining means that the image forming job is permitted,
    first execution means for executing distributed image formation on image forming media by said first, second image forming apparatuses with respect to the image forming job which is determined to be permissible by said determining means when switching to the distributed image formation in said first, second image forming apparatuses is selected according to the display of said second display means, and
    second execution means for executing image formation on an image forming medium in said first image forming apparatus or second image forming apparatus with respect to the image forming job which is determined to be permissible by said determining means when switching to the distributed image formation in said first, second image forming apparatuses is not selected according to the display of the second display means.

2. In claim 1, said first image forming apparatus is a master device and said second image forming apparatus is a slave device.

3. In claim 1, said first, second image forming apparatuses are color digital copying machines.

4. In an image forming system which comprises at least one terminal and first, second image forming apparatuses connected to said terminal via a communication line, for respectively effecting image formation on image forming media based on an image forming job from said terminal and in which said first, second image forming apparatuses are set close to each other, the image forming system characterized in that
said terminal includes:
  transmission means for transmitting an image forming job having a password, for causing said first, second image forming apparatuses to distributedly effect image formation to said first image forming apparatus, and
  said first image forming apparatus includes:
    receiving means for receiving the image forming job having the password and transmitted from said terminal,
    storage means for sequentially storing the image forming job having the password and received by said receiving means,
    first display means for displaying image forming jobs stored in said storage means,
    selecting means for selecting one of the image forming jobs displayed on said first display means,
    input means for inputting the password of the image forming job,
    determining means for determining whether the image forming job is permitted or not according to whether or not the password input by said input means and the password of the image forming job selected by said selecting means coincide,
    second display means for displaying a selection screen which indicates whether or not distributed image formation by said first, second image forming apparatuses is switched to independent image formation in said first image forming apparatus or second image forming apparatus when it is determined by said determining means that the image forming job is permitted,
    first execution means for executing image formation on an image forming medium by said first image forming apparatus or second image forming apparatus with respect to the image forming job which is determined to be permissible by said determining means when switching to the independent image formation in said first image forming apparatus or second image forming apparatus is selected according to the display of said second display means, and
    second execution means for executing distributed image formation on image forming media in said first, second image forming apparatuses with respect to the image forming job which is determined to be permissible by said determining means when switching to the independent image formation in said first image forming apparatus or second image forming apparatus is not selected according to the display of said second display means.

5. In claim 4, said first image forming apparatus is a master device and said second image forming apparatus is a slave device.

6. In claim 4, said first, second image forming apparatuses are color digital copying machines.

7. In an image forming system which comprises at least one terminal and first, second image forming apparatuses connected to said terminal via a communication line, for respectively effecting image formation of a plurality of copies on image forming media based on an image forming job from said terminal and in which said first, second image forming apparatuses are set close to each other, the image forming system characterized in that said terminal includes:

transmission means for transmitting an image forming job having a password, for causing said first image forming apparatus or second image forming apparatus to independently effect image formation of a plurality of copies to said first image forming apparatus, and said first image forming apparatus includes:

receiving means for receiving the image forming job having the password and transmitted from said terminal, storage means for sequentially storing the image forming job having the password and received by said receiving means, first display means for displaying image forming jobs stored in said storage means, first selecting means for selecting one of the image forming jobs displayed on said first display means, input means for inputting the password of the image forming job, determining means for determining whether the image forming job is permitted or not according to whether or not the password input by said input means and the password of the image forming job selected by said first selecting means coincide, second display means for displaying a selection screen which indicates whether or not the independent image formation by said first image forming apparatus or second image forming apparatus is switched to distributed image formation in said first, second image forming apparatuses when it is determined by said determining means that the image forming job is permitted, second selecting means for selecting switching to the distributed image formation in said first, second image forming apparatuses according to the display on said second display means, third display means for displaying a setting screen of the respective numbers of copies which are subjected to the distributed image formation in said first, second image forming apparatuses when the distributed image formation in said first, second image forming apparatuses is selected by said second selecting means, setting means for setting the number of image formation copies in said first image forming apparatus and the number of image formation copies in said second image forming apparatus according to the display of said third display means, first execution means for executing distributed image formation on image forming media by said first, second image forming apparatuses with respect to the image forming job which is determined to be permissible by said determining means based on the numbers of image formation copies set by said setting means, and second execution means for executing image formation of a plurality of copies on image forming media in said first image forming apparatus or second image forming apparatus with respect to the image forming job which is determined to be permissible by said determining means when switching to the distributed image formation in said first, second image forming apparatuses is not selected by said second selecting means.

8. In claim 7, said first image forming apparatus is a master device and said second image forming apparatus is a slave device.

9. In claim 7, said first, second image forming apparatuses are color digital copying machines.

10. In an image forming system which comprises at least one terminal and first, second image forming apparatuses connected to said terminal via a communication line, for respectively effecting image formation of a plurality of copies on image forming media based on an image forming job from said terminal and in which said first, second image forming apparatuses are set close to each other, the image forming system characterized in that said terminal includes:

transmission means for transmitting an image forming job having a password, for causing said first image forming apparatus or second image forming apparatus to independently effect image formation of a plurality of copies to said first image forming apparatus, and said first image forming apparatus includes:

receiving means for receiving the image forming job having the password and transmitted from said sterminal, storage means for sequentially storing the image forming job having the password and received by said receiving means, first display means for displaying image forming jobs stored in said storage means, first selecting means for selecting one of the image forming jobs displayed on said first display means, input means for inputting the password of the image forming job, determining means for determining whether the image forming job is permitted or not according to whether or not the password input by said input means and the password of the image forming job selected by said first selecting means coincide, second display means for displaying a selection screen which indicates whether or not the independent image formation by said first image forming apparatus or second image forming apparatus is switched to distributed image formation in said first, second image forming apparatuses when it is determined by said determining means that the image forming job is permitted, second selecting means for selecting switching to the distributed image formation in said first, second image forming apparatuses according to the display on said second display means, deciding means for deciding the numbers of image formation copies in said first, second image forming apparatuses based on the processing abilities of image formation respectively in said first, second image forming apparatuses when the distributed image formation in said first, second image forming apparatuses is selected by said second selecting means, first execution means for executing distributed image formation on image forming media in said first, second image forming apparatuses with respect to the image forming job which is determined to be permissible by said determining means based on the numbers of image formation copies decided by said deciding means, and second execution means for executing image formation of a plurality of copies on image forming media in said first image forming apparatus or second image forming apparatus with respect to the image forming job which is determined to be permissible by said determining means when switching to the distributed image formation in said first, second image forming apparatuses is not selected by said second selecting means.

11. In claim 10, said first image forming apparatus is a master device and said second image forming apparatus is a slave device.

12. In claim 10, said first, second image forming apparatuses are color digital copying machines.

* * * * *